(12) United States Patent
Xiong et al.

(10) Patent No.: US 8,003,152 B1
(45) Date of Patent: Aug. 23, 2011

(54) FAST-HYDRATABLE KONJAC COMPOSITION

(75) Inventors: Haishan Xiong, New Hope, PA (US); Thomas C. Bailey, San Francisco, CA (US); Mei Li, New Hope, PA (US); Shangbin Xiong, Tianjin (CN)

(73) Assignee: Vitalico LLC, San Mateo, CA (US)

( * ) Notice: Subject to any disclaimer, the term of this patent is extended or adjusted under 35 U.S.C. 154(b) by 862 days.

(21) Appl. No.: 11/692,725

(22) Filed: Mar. 28, 2007

Related U.S. Application Data

(60) Provisional application No. 60/788,597, filed on Mar. 30, 2006.

(51) Int. Cl.
*A23L 1/05* (2006.01)
*A21D 2/16* (2006.01)

(52) U.S. Cl. .......................... 426/573; 426/654

(58) Field of Classification Search ............. 426/573, 426/575, 576, 577, 578, 654
See application file for complete search history.

(56) References Cited

U.S. PATENT DOCUMENTS

| | | | | |
|---|---|---|---|---|
| 5,486,364 A | * | 1/1996 | King et al. | 424/488 |
| 5,624,612 A | * | 4/1997 | Sewall et al. | 264/4.1 |
| 6,162,906 A | * | 12/2000 | Ohashi et al. | 536/1.11 |

* cited by examiner

*Primary Examiner* — D. Lawrence Tarazano
*Assistant Examiner* — Katherine DeGuire
(74) *Attorney, Agent, or Firm* — Thaddius J. Carvis

(57) ABSTRACT

Disclosed is a fast-hydratable konjac composition and a process of modifying regular konjac. The invention further discloses the formulation of a synergistic composition with modified konjac and other supporting agents. The resulted product is readily hydrated in water to form a stable, highly viscous gel and solution.

22 Claims, No Drawings

FAST-HYDRATABLE KONJAC COMPOSITION

RELATED APPLICATION

This application claims priority to prior U.S. Patent Application No. 60/788,597 filed Mar. 30, 2006, which is incorporated herein by reference in its entirety.

BACKGROUND OF THE INVENTION

The present invention relates to an improved hydrophilic colloid composition based on konjac that readily hydrates and forms a highly viscous and stable gel and is therefore useful in a wide range of useful products including food, cosmetic, medicinal and dietary supplement compositions and others, particularly those requiring properties of rapid, simple hydration with stable viscosity maintenance over wide ranges of temperature and concentration.

The use of hydrocolloids, such as konjac, for improving the viscosity and flow of aqueous liquids has been known for years. Konjac and some other hydrocolloids absorb and retain large quantities of water relative to their dry weights and form viscous gels. Due to its exceptional water retention capability, konjac is used in a variety of applications. Many improvements have been made to utilize konjac and other naturally-derived materials with improved purity and functionality. Konjac falls into the general category of compositions referred to as hydrophilic colloids, which are compositions capable of mixing with water or other aqueous liquid to form a hydrocolloid, which can be a thickened or gelled material. Hydrophilic colloids can be naturally derived, like konjac, or obtained synthetically. In the case of natural hydrophilic colloids, they can be derived from animal or vegetable sources, with konjac being from vegetable sources. In general, hydrophilic colloid molecules have an affinity for water molecules and, when dispersed in water, become hydrated. Hydrated colloids (hydrocolloids) swell and increase the viscosity of the system, thereby improving stability by reducing the interaction between particles and their tendency to settle. Hydrophilic colloids are generally taken to include colloid systems wherein the colloid particles are dispersed in water (a colloid system is simply a mixture in which two substances are interspersed between each other). Konjac and other hydrophilic colloids are known to be used in combination in various stages of purification.

The colloid particles in a hydrocolloid may possess a net surface electrical charge, the sign of which can depend on the chemical properties of the colloid and the pH of the system. The presence of a surface charge produces repulsion of the charged particles and thus reduces the likelihood that the particles will adhere to one another and settle. Hydrocolloids, thus, are typically in the form of charged colloid particles distributed throughout water or other aqueous phase. Depending on the amount of available water, such a hydrocolloid can take on different states, typically being in the form of a gel or sol (liquid). Hydrocolloids can be either irreversible (single state) or reversible, e.g., they can exist in a gel and sol state and alternate between states by heating or cooling. Because their stability can depend on pH, charge, concentration, and temperature, there are a number of factors that can be helpful or the opposite to stability.

To best achieve the degree of stability required for a particular use, the natural sources of hydrophilic colloids are purified and particulated in dry form. The dry hydrophilic colloid materials, like konjac, however, are often very difficult to dissolve in cold water and often even in warm water. When purified, however, materials like konjac often take up water so quickly at their surfaces that clumps form without achieving a thorough hydration necessary to form a stable hydrocolloid. The clumps take excessive periods of time to hydrate or in some situations fully fail to hydrate for practical application.

There is a need for konjac based gelling agents that can rapidly hydrate, e.g., fully dissolve in water to reach peak viscosity in 2 minutes or less at 70° C., and at room temperature (e.g., 25° C.) reach about 50% of peak viscosity in 10 minutes, and peak viscosity in less than an hour. The fast hydration is attributable to the combination of finer konjac particles and the presence of the supporting agents.

Regular konjac, as commercially available, forms excessive amounts of lumps when mixed with water, even under agitation. There is need for improvement to avoid or ameliorate the natural interactions between konjac and water and other useful compositional components. While konjac is highly desired for its ability to form hydrated gels, the gels formed from commercial konjac lack the stability that would be desired for the economical and efficient use of the compositions in their gel forms. Regular konjac gel loses a significant amount of its viscosity after 5 to 10 hours at room temperature. It would be desirable to provide konjac compositions that could maintain up to 90% or more of peak viscosity for several days, e.g., as long as 4-5 days, at room temperature. Improvement in stability at elevated and reduced temperatures, e.g., −10° C. or 120° C., would also be desirable and cannot be satisfactorily achieved with current commercial compositions while also having good dispersibility under practical conditions.

There are a lot of impurities in the regular konjac powder, and we have found that even purified forms contain impurities that impart a distinctive smell, which is acceptable for some situations but limits the uses of konjac, especially in food applications. Moreover, the impurities limit solubility and can cause undesirable interactions, limiting uses for point-of-service settings. Konjac and some other hydrocolloids absorb and retain large quantities of water relative to their dry weights and form viscous gels. Due to its exceptional water retention capability, konjac is used in a variety of applications. Other purity considerations are important for products used in the petroleum drilling fluid where fast hydration and high viscosity are very important, and in detergents, paper, textiles, creams/lotions, adhesives, and so on, where color, odor and shelf-stability are important.

Regular konjac, as commercially available, is difficult to use. Preparing konjac gels and solutions is difficult and time consuming. It often takes 2 to 6 hours to dissolve regular konjac powder in water. Even at relatively high temperatures of 80° C. or higher, rigorous agitation is required to ensure full dissolution, resulting in high energy costs. Without agitation, konjac forms un-dissolved lumps that decrease the quality of the final products. Given the high viscosity of konjac gel even at a low concentration, rigorous agitation consumes a significant amount of energy and may not even be practical for certain applications.

Efforts have been undertaken to improve dissolvability of konjac. One strategy is to use finer konjac powder. However, simply grinding regular konjac generates large amount of heat which may disrupt molecular structure of konjac. Conventional grinding not only causes the konjac flour to degrade as evidenced by its turning brown and smelling burnt, but also causes a large reduction in attainable viscosity.

It was reported in U.S. Pat. No. 5,733,593 that fine konjac powder could be produced by grinding deep-frozen konjac powder. The fine powder dissolves more rapidly than regular konjac. However, this procedure is capital intensive and has high production cost. In addition, the fine powder alone does not solve the lump formation issue completely and purity issues remain. Moreover, konjac gel, from either regular or fine powder, loses significant viscosity after 5 to 10 hours at room temperature. This instability reduces the applications of konjac.

Other hydrocolloids have been shown to have synergistic effects when combined with konjac. Among these, xanthan and carrageenan have been shown to improve the strength and viscosity of the konjac gel. This is presumably due to non-covalent interactions among different polysaccharide chains. However, simply combining these other hydrocolloids with konjac does not improve the speed of dissolution. It still takes hours for full hydration of the simple combination hydrocolloids. High temperatures (80° C. or higher) and constant agitation are still required to fully dissolve the konjac power. Neither does this simple combination solve the lump formation issue of konjac. In U.S. Pat. No. 5,462,761, there is described an aggregate composition comprising microcrystalline cellulose and glucomannan, which is derived from konjac. The konjac glucomannan, the inventors say can be native (crude) konjac flour, clarified konjac glucomannan, cold-melt konjac or preferably purified konjac glucomannan, all of which are known in the art. Their composition comprises aggregate particles of microcrystalline cellulose (MCC) covered with glucomannan. The average particle size of the inventive dry MCC/glucomannan spheroidal particles is 0.1 to 100 microns, e.g., most preferably 12 to 35 microns. These compositions are said to be particularly useful as bulking agents and as fat replacers, especially in water-based formulations used as foods. Testing, which entailed mixing with water in a blender at 15,000 RPM for 15 minutes, summarized in Table 1, emphasized the texture of hydrated composition as being "smooth, spheroidal particles" as opposed to a gel. It would be desirable to utilize the gel-forming capabilities of konjac in a composition which enabled rapid, easy hydration.

In U.S. Pat. No. 5,536,521 to Shelso, et al., there is described a rapidly hydratable konjac flour which is said to gain at least 60% of its potential peak viscosity within 10 minutes after dispersal into water at 25° C., at least 80% of its potential peak viscosity within 20 minutes after dispersal into water at 25° C. and from 80 to 100% of its potential peak viscosity within 30 minutes after dispersal into water at 25° C. Among the methods disclosed are two-step flaking and grinding; however, despite the rigorous processing, improved purity and functionality would still be desired.

In another patent mentioning konjac and microcrystalline cellulose, U.S. Pat. No. 5,605,712, describes a stabilizer composition, said to be useful for stabilizing frozen desserts, having (a) a first component of microcrystalline cellulose (MCC) coprocessed with a calcium/sodium alginate salt complex and containing sufficient MCC such that the weight ratio of MCC to alginate salt complex is greater than about 80:20, in combination with (b) a second component of at least one water soluble hydrocolloid selected from the group consisting of guar gum, locust bean gum, sodium alginate, carrageenan, gum tragacanth, karaya gum, gum arabic, agar, konjac, xanthan gum, carboxymethylcellulose, methylcellulose, hydroxymethylcellulose and hydroxypropylmethylcellulose. The teachings leave the person skilled in the art with the need for improvements in the gelling, stability, hydration and purity of the konjac.

In U.S. Pat. No. 5,624,612, there is described nonaggregating hydrocolloid microparticulates, which are said to be substantially dry, rehydratable, water-dispersible, gel-forming, and porous. They are described as containing a gelling hydrocolloid like konjac and internally or internally and externally at least one water-soluble, non-gelling, hydration enhancing hydrocolloid, such as various gums, and can include water-soluble components like konjac. Again, the thrust appears to be to prepare having particular utility as fat replacement components in foods, without providing other needed improvements in ease of hydration, solubility, purity and stability.

Konjac has been proposed for use in a wide variety of foods. For example, in U.S. Pat. No. 4,582,714, there are described ungelled processed food products, particularly emulsions, containing a stabilizing or thickening agent, such as ice cream, whipping cream, cheese spreads, cheese slices, milk drinks, meringues and the like. These products, which when produced on a commercial scale normally incorporate a stabilizing and/or thickening agent to improve their processability, texture, organoleptic properties and storage capability. There, conventional stabilizing and thickening agents, such as carob gum and/or cellulose ethers such as the hydroxyethyl and carboxymethyl ethers, are replaced with glucomannans, especially those derived from *Amorphophallus* species and especially from *A. rivieri* and its varieties (often referred to as *A. konjac*). In U.S. Pat. No. 6,548,097, konjac is said to be useful in preparing frozen confections comprising a gel composition. And, in U.S. Pat. No. 5,665,418, there is described a fibrous and granular konjac prepared from solidified konjac said to be suitable for processed foods or as a dietary food by itself. It is prepared by crushing a kneaded and solidified mixture of konjac roots and lime to form granular and fibrous pieces that are about less than 6 mm long and contain 5 to 10% moisture. Again, improvements are needed in ease of hydration, solubility, purity and stability.

Among the various uses of konjac is as a textural components for beverages and other liquids. In U.S. Pat. No. 6,730,336, there are described fortified beverages with improved texture and flavor impact at lower dosage of solids. Konjac and other carbohydrates are suggested as fat mimetic materials in beverages. To similar effect are U.S. Pat. No. 6,379,737, which describes a dissolution agent for making rapidly soluble instant beverage products, and U.S. Pat. No. 6,290,997, wherein the texture and flavor impact of beverages is modified at low dosage of solids. In U.S. Pat. No. 6,673,384, konjac mannan is one of a number of materials suggested to add a creamy mouth feel agent for foods and beverages. And, in U.S. Pat. No. 6,042,854, gellan gum is used to improve physical stability of liquid nutritional products normally stabilized with konjac or other stabilizers. In U.S. Pat. No. 6,582,749, konjac can be added to low fat edible emulsions. U.S. Pat. No. 6,455,090, relates to a liquid additive thickener which can contain konjac as a thickener to help form viscous solutions and gels to thicken gravy, dressing, sauce, mousse and jelly. In U.S. Pat. No. 5,700,513, liquid nutritional product containing improved stabilizer composition in gelatinous food products particularly suitable for nutrition of patients with dysphagia and has good eating qualities, for instance, ease of swallowing, owing to the soft jelly form. Xanthan gum, konjac mannan, or the like, may be used as a part of a gelling agent. And, in U.S. Pat. No. 7,037,539, there is disclosed a strawberry fruit juice drink made with konjac or other hydrocolloid gum as a thickener. In each of these cases, there remains a need for improved ease of hydration, solubility, purity and stability.

There are yet a wide variety of known uses for related gums, including well treatment fluid compositions as described in U.S. Pat. No. 6,983,801, wherein a well treatment fluid composition comprises a solvent (such as water), a polymer soluble or hydratable in the solvent, a crosslinking agent, an inorganic breaking agent, and an ester compound. Preferably, the hydratable polymer is a polysaccharide, such as galactomannan, cellulose, or derivatives thereof. In U.S. Pat. No. 6,685,978, there are described gelled and gellable compositions for food products. The principal description is of gel-in-place compositions for food products, as well as to food products including the gel-in-place compositions. The preparation, storage, distribution and cooking of food products is said to be improved without excessive seepage of liquid from the food products. The patent describes the use of various polysaccharides, including konjac gum that can form a thixotropic gel. In U.S. Pat. No. 6,558,652, there is described a process for producing glucomannan gel particles wherein a particulate glucomannan gel is produced by swelling a glucomannan-rich flour with water in the presence of ethanol, treating the swollen particles with an alkali to form gelled particles followed by drying. The dried gel particles are incorporated into hygienic or cosmetic preparations as a deposit-cleaning agent. U.S. Pat. No. 6,531,169 describes a composite food composition, in particular a frozen water ice confection in which two or more component phases are present in an intermingled manner that is neither consisting of distinct component blocks of phases, nor present as a fine mixture(s) of phases, and in which at least one of the component phases comprise a polyanionic gel. Konjac is described as an optional neutral hydrocolloid, which can be included. U.S. Pat. No. 5,789,004, describes a stabilizer composition, useful for reduced fat frozen desserts and whipped toppings, containing, as a first component, microcrystalline cellulose coprocessed with guar and, as a second component, microcrystalline cellulose coprocessed with carboxymethylcellulose. Konjac is identified as one of many useful hydrocolloids. In U.S. Pat. No. 4,894,250, there are described thermo-irreversible edible gels of glucomannan and xanthan gums, with konjac as an optional ingredient, useful to simulate the texture of natural meat offals. U.S. Pat. No. 4,844,913 describes a low-calorie foodstuff for processed food comprising gel-particles of glucomannan coagulum and also a low-calorie processed food comprising gel-particles of glucomannan coagulum. In particular, the description utilizes konjac glucomannan in the preparation of functional foods and provides a dietary fiber food component. And, in U.S. Pat. No. 4,676,976, there is described a konjak mannan-containing reversible gel useful in preparing processed meat products comprising a thermally treated, uniform mixture of a meat and a konjac mannan gel. The konjac mannan gel is obtained by steaming a sol of konjac mannan gel.

Thus, despite the wide use of konjac over a long period of time, there remains a need for improved ease of hydration, solubility, purity and stability.

SUMMARY OF THE INVENTION

In view of the problems with the art and the need for improvement, it is one objective of the invention to provide improved gelling compositions, dry and hydrated, based on konjac.

It is another objective of aspects of the invention to provide gelling compositions, that can hydrate quickly with minimum temperature or agitation requirements.

It is yet another object of aspects of the invention to provide gelling compositions that can easily form a homogeneous gel.

It is yet another objective of some aspects of the invention to provide gelling compositions which are stable over an extended time period compared to currently identified modifications to konjac.

It is yet another object of the invention to provide konjac-based gelling compositions having the advantageous gelling characteristics of konjac but which exhibit improved ease of hydration, solubility, purity and stability.

These and other objects of the invention are achieved in at least its preferred aspects by providing an improved gelling composition based on konjac, improved processes for preparing such compositions, improved products such as foods utilizing the compositions and improved food and other compositions utilizing the improved gelling compositions.

In one aspect the invention provides an improved gelling composition based on konjac, comprising: konjac as a gelling agent, a first supporting agent, which comprises a member selected from the group consisting of carrageenan gum, Jerusalem artichoke, psyllium husk and xanthan gum, and optionally a second supporting agent, which comprises at least one member selected from the group consisting of agar, (sodium) alginate, carboxymethylcellulose, casein, guar gum, gellan gum, gelatin, gum arabic, locust bean gum, and pectin.

In another aspect the invention provides improved processes for preparing such improved compositions, comprising: suspending konjac in an aqueous solution of phosphate salts and up to 90% (v/v) ethanol; recovering the konjac from the suspension; and grinding the konjac to an average particle diameter of less that 0.15 mm while suspended and/or after recovery from suspension. Preferably, the konjac recovered from suspension, suspended in an aqueous alcohol solution, washed therein and recovered, this sequence being repeated at least 2 times.

In a related aspect, the invention provides improved method of making products such as foods utilizing the compositions, comprising: adding the improved composition described above to an edible ingredient to prepare a food product.

In a further related aspect, the invention provides improved food and other compositions utilizing the improved gelling compositions, comprising: hydrating the products improved by the compositions of the invention described above to an edible ingredient to prepare a food product.

Other preferred aspects of the invention will be described below.

DETAILED DESCRIPTION OF THE INVENTION

The compositions of the invention are based on konjac and have significantly improved properties that make them useful in foods and other compositions needing gelling, thickening, stabilizers and or other textural modification. The compositions of the invention provide the advantageous gelling characteristics of konjac yet exhibit improved ease of hydration, solubility, purity and stability. In preferred forms, the compositions will fully dissolve in water to reach peak viscosity in 2 minutes or less at 70° C. At room temperature (e.g., 25° C.), the compositions can reach about 50% of peak viscosity in less than 2 minutes, and can reach essentially peak viscosity in less than 10 minutes. The hydration can thus be characterized as fast and the products being rapidly-hydratable, and this improvement can be attributed to a combination of fine particle size of purified konjac and the presence of the supporting agents as will be described and exemplified below in further detail.

The compositions of the invention can effectively utilize konjac or glucomannan obtained therefrom in any commercial form or purity because the invention enables its purification and physical improvement. It is known that konjac is botanically a perennial plant of the family Araceae and can be identified as *Amorphophalus Konjac* C. Koch. In one commercial form, the Japanese have traditionally made "konnyaku" from the tuber of this plant. The predominant component of edible konnyaku is a glucomannan called konjac mannan. Commercial forms of konnyaku for food can be made from the konjac flour, which is obtained from the dried tuber of this plant. There are many forms of konjac flour and its mannan-containing derivatives, and all are useful according to the invention. Konjac flour contains a variety of insoluble materials as well as a major amount of desirable water-soluble substances. Regular konjac flour is typically produced by slicing the tuber and removing the skin, drying the cut tuber and then grinding to form the flour, which can be air classified to suitable particles sizes, e.g., from 60 to 80 US mesh, with removal of fines. The principal functional soluble constituent of interest is glucomannan, a polysaccharide comprised of D-glucose and D-mannose. For purposes of definition for the present invention, therefore, the term "konjac" is meant to include konjac or its derived glucomannan component in all commercial forms.

The invention improves the rate of hydration of native konjac flour, referred to herein as "regular konjac flour" and its gelling derivatives in room temperature or cool water, which is notorious for being slow. This slow hydration is a problem for many uses of konjac, particularly those which employ continuous flow production. Unlike regular konjac flour, the composition of the invention will form few, if any, lumps in water even under no agitation. This improvement may be attributable to synergistic interactions between konjac in purified form and identified supporting agents. In addition, the hydrated gel form of the compositions of the invention is more stable than gel from regular konjac flour. Regular konjac gel loses a significant amount of its viscosity after 5 to 10 hours at room temperature. The hydrated gel made from the composition of the invention maintains at least 90% peak viscosity for as long as 4 to 5 days at room temperature. Preferred maximum viscosities, measured for a 1% solution in water at 25° C. using a Brookfield LVDVE viscometer at 15 rpm are over 30,000 cps, and preferably over 35,000 cps. The examples below show these in comparison to viscosities of regular konjac flour solutions.

Moreover, the fully hydrated gel of a composition of the invention is stable over a wide range of temperatures. For example, after extreme temperature treatments at −10° C. or 120° C. for 2 hours, the gel preferably maintains at least 85% its peak viscosity. This long-lasting stability may be attributable to the modification by phosphate salts as will be described below, which is accomplished in the presence of a suitable alcohol. The phosphate salt is believed to modify the acetyl groups on the polymer chain and form cross-linkages between konjac chains while the alcohol protects the glucomannan from being complexed by the phosphate. Applicants present this discussion by way of explanation of the surprisingly good results achieved but do not wish to be bound by any theory.

It is an important feature of the invention that the phosphate modification takes place in a solution of a suitable alcohol, such as ethanol solution. Use of ethanol has two benefits in addition to the possible effect noted above. One is to purify the fine konjac. There are a lot of impurities in the regular konjac powder. During the grinding process, these impurities dissolve in the ethanol solution, resulting in a more pure form of konjac. The other benefit is deodorization. Regular konjac powder has a distinctive smell. This smell limits the uses of konjac, especially in food applications. Dissolving the impurities in ethanol solution significantly reduces the smell.

The products of the invention may be used in applications where fast hydration, high viscosity, and/or high stability are desirable. For example, it can be used as a stabilizer and emulsifier in many food applications to stabilize the food items and maintain moisture as well as to improve texture and mouth-feel of food products. More importantly, this invention makes it possible to prepare the said composition in point-of-service settings. The products from the said invention may also be used in the petroleum drilling fluid where fast hydration and high viscosity are very important. It can also be used in detergents, paper, textiles, creams/lotions, adhesives, and so on.

In general, the composition of the invention can be described as a konjac composition that is fast-hydratable, wherein the composition comprises konjac as a gelling agent, a first supporting agent, which comprises a member selected from the group consisting of carrageenan gum, Jerusalem artichoke, psyllium husk and xanthan gum, and optionally a second supporting agent, which comprises at least one member selected from the group consisting of agar, (sodium) alginate, carboxymethylcellulose, casein, guar gum, gellan gum, gelatin, gum arabic, locust bean gum, and pectin. These compositions utilize purified konjac as a gelling agent, and the konjac comprises 30% to 90% by weight of the composition. This composition can be used alone for preparing a gel with water or other aqueous liquid or can be mixed with other food or other materials to supply a thickening or gelling property.

The compositions of the invention will, as noted, comprise at least one first supporting agent, which comprises a member selected from the group consisting of carrageenan gum, inulin (preferably from Jerusalem artichoke), psyllium husk and xanthan gum, which comprises from 10% to 80% by weight of the composition. Among these, the use of inulin or Jerusalem artichoke powder is preferred. Inulin is a naturally occurring fructo-oligosaccharide composed of a mixture of oligomers of varying degrees of polymerization ("DP") or molecular weights that occurs naturally plants such as onion, garlic, Jerusalem artichoke, dahlia and chicory for plant energy storage. The inulin produced from different plants, at different stages in the growing cycle of a plant, or under different climatic conditions, will normally have different average DP's. Jerusalem artichoke, also known as topinambur, is the subterranean stem tuber of *Helianthus tuberosus* L. Compositae, a kind of sunflower native to North America, and is the preferred source of inulin.

In addition to the konjac and the first supporting agent as described above, the compositions of the invention can also optionally include a second supporting agent, which can be any of the group of edible hydrophilic colloids not specifically identified above as a first supporting agent. While optional, the composition of the invention will preferably comprise up to about 50% of the second supporting agent by weight of the composition.

The compositions of the invention attribute their improved properties not only to the composition, but to the physical form and purity which is achieved through processing according to the invention. While procedures giving equivalent results can be derived from the preferred procedures of the invention, there are several features of the processing which are believed important to the achievement of the improved results. In one form, the process will entail suspending konjac in any form in an aqueous solution of phosphate salts and up to 90% (v/v) a suitable alcohol, recovering the konjac from the suspension, and grinding the konjac to an average particle diameter of less that 0.15 mm while suspended and/or after recovery from suspension. Because improvements in purity and functionality in terms of hydration, gelling and stability can be improved by repeating the above steps of suspending and recovering, it is preferred to repeat these steps at least 2 times, preferably from 2 to about 6 times. Additional steps can be employed as the economics justify it.

The alcohol used in the aqueous solution is preferably ethanol where the product is used for food applications, but other suitable alcohols having the necessary protective effect during processing can also be utilized. Among these are n-propyl alcohol, i-propyl alcohol, and the like.

The use of a phosphate salt during the purification is important to achieve the desired results and a suitable phosphate will preferably be selected from the group consisting of alkaline earth and alkali metal salts of pyrophosphate, trimetaphosphate, phosphate, hydrophosphate, dihydrophosphate, and combinations of two or more of these, in amounts sufficient to provide a total phosphate content (as $PO_4$) of from about 1% to about 50%. Preferably, the phosphate will comprise sodium trimetaphosphate at a concentration of from about 20 to about 40%, e.g., about 30%.

The composition can be prepared by adding konjac, the first supporting agent and the optional second supporting agent in any suitable physical form, e.g., solid state, suspension, solution, or combinations thereof, in any desired sequence. During the stage where the konjac is suspended in solution, the pH of the solution is adjusted to within the range of from about 4 to about 9. The solution should be from about 5 to about 20 times the volume of the konjac powder added, where the konjac has a glucomannan content of at least about 60%, e.g., from about 60 to about 80%. The suspension is maintained under mild agitation (stiffing without cavitation) at a temperature and a time effective to solubilize color and or other materials in the konjac. Typically it is maintained at a temperature of from about 30° C. to about 70° C. for a time of from about 1 to about 8 hours. Following this suspension time, the suspension is cooled, e.g., to less than about 25° C., typically to about 4° C. The suspension should be ground during processing or following cooling. For example, using a Raymond grinding mill or similar types with a water-cooling system, with the grinding heads gap set to 0.05 mm, the suspension or recovered solids are ground sufficiently to achieve an effective particle size following grinding and drying of less than about 0.15 mm. For example, grinding for from about 10 to about 120 minutes, e.g., for 30 minutes will be satisfactory. The suspension is preferably centrifuged to recover the solids, e.g., centrifuge at 400×g until the solids are separated. Separation can, if desired, be accomplished by any other suitable technique, such as filtration.

To eliminate excess phosphate salt, the solid is then suspended in a solution containing 10% to 90% ethanol, e.g., from 20 to 50%, or other suitable alcohol (v/v) and subjected to agitation. Centrifuge at 400×g or filtrate to retrieve the solid. The washing is repeated several times, preferably sufficient times, e.g., about 2 to about 10 times, preferably from about 3 to 6 times, until the phosphate (calculated based on $PO_4$) content is below 0.04%, e.g., within the range of from about 0.01% to about 0.1%. As a final stage in preparation the solid can be finally dried, such as by spreading on a metal plate or utilizing a drum dryer and dried under vacuum at room temperature. Alternately, it may be dried on a heated (e.g., to about 60 to about 80° C.) conveyer belt. Drying is complete when there is no further weight loss within 30 minutes. The final product is then collected and placed in bags which are then sealed. This final product is a phosphate modified, ultra-fine konjac powder having many uses and utilities achieved more effectively than the starting material because it exhibits high viscosity when hydrated, shows rapid attainment of viscosity when added to aqueous liquid, exhibits extended viscosity stability, has good color and has both good odor and flavor.

The recovered composition of the purification procedure can be in any suitable physical form, such as in the form of solid, suspension, solution, partially hydrated gel, fully hydrated gel (e.g., a gel can prepared from about 1 to about 10 grams, preferably about 5 grams per 1 liter of water), or as a component of pre-mix with other items or combination thereof. A preferred physical form is a dry particulate having a fine particle size which is effective to assure rapid hydration, e.g., within the range of from about 100 to about 200 US mesh.

The following examples are presented to further illustrate and explain the invention and are not to be taken as limiting in any regard. Unless otherwise indicated, all parts and percentages are by weight and based on the weight of the composition at the indicated stage of processing.

Example 1

Method of Making Phosphate Modified Ultra-Fine Konjac Powder

Suspend 1 kg regular konjac powder in a solution containing 30% (wt/v) sodium trimetaphosphate and 30% ethanol (v/v). Adjust pH to 4-9. Ten liters of the solution is employed for the 1 kg of the konjac powder. The suspension is maintained at a temperature of about 50° C. for about 3 hours while mildly agitating using a motorized stiffing device. Following this mixing period, the suspension is cooled to about 25° C. The suspension is then subjected to grinding in a Raymond grinder mill with a liquid cooling system. The grinding heads are adjusted to a gap of about 0.05 mm. The suspension is ground for 30 minutes or until the solution yields a powder particle diameter is less than 0.15 mm, preferably 0.08 mm to 0.1 mm. The suspension is then centrifuged at 400×g to retrieve the solid. To eliminate excess phosphate salt, the solid is then suspended in a solution containing 30% ethanol (v/v) via agitation. Centrifuge at 400×g or filtrate to retrieve the solid. Repeat the washing three times or until the phosphate (calculated based on $PO_4$) content is below 0.04%. The solid is then spread on a metal plate and dried under vacuum at room temperature. When drying produces no further weight loss, the final product is collected and sealed in bags.

Example 2

Modified Preparation of Phosphate Modified Ultra-Fine Konjac Powder

Take 1 kg of the solid as described in Example 1 just before the final drying step. Add 0.5 kg of a first supporting agent comprising Jerusalem artichoke and 0.2 kg of locust bean gum as a second supporting agent to the resulted wet solid. Mix thoroughly. Spread the mixture on a metal plate and dry under vacuum at room temperature. Collect the final product in sealed bags when there is no further weight loss.

Example 3

Gelled, Modified Preparation of Phosphate Modified Ultra-Fine Konjac

Take 1 g of the phosphate modified ultra-fine konjac powder of Example 1 and mix with 1 g of psyllium husk as a first supporting agent and 0.05 g of carboxymethylcellulose as a second supporting agent. Mix thoroughly. Add the mixture to 100 ml water at 70° C. Apply mild agitation. A fully hydrated gel forms within 2 minutes. This gel maintains the high viscosity for 7 days or longer at room temperature.

Example 4

Modified Preparation of Phosphate Modified Ultra-Fine Konjac Powder

Take 0.6 kg of the solid as described in Example 1. Add 0.4 kg of a first supporting agent comprising Jerusalem artichoke and no second supporting agent to the resulted wet solid. Mix thoroughly. Spread the mixture on a metal plate and dry under vacuum at room temperature. Collect the final product in sealed bags when there is no further weight loss.

Viscosities are measured for a 1% solution of this product in water at 25° C. using a Brookfield LVDVE viscometer at various times following hydration, with these results shown below in comparison to viscosities of regular konjac flour solutions.

|  | Time (min) after mixing with water | | | | | |
| --- | --- | --- | --- | --- | --- | --- |
|  | 5 | 10 | 30 | 60 | 90 | 120 |
| Example 4 | 31696 | 36721 | 38654 | 38123 | 39011 | 38232 |
| regular konjac | 862 | 2580 | 8037 | 17511 | 26121 | 28705 |

Example 5

Modified Preparation of Phosphate Modified Ultra-Fine Konjac in Low- and Non-Fat Milk Milk or milk-dominated diary products with lower fat content are becoming ever more popular with the health awareness running high. However, the taste and mouth feel of this type of milk is different from the whole milk. Many consumers may prefer the cream taste of the whole milk. The product of Example 2 is added to milk to help these consumers to enjoy both the taste and health benefits of lower fat milk. The product of Example 2 is fully hydrated in water to form a final concentration of 5% to 10% (w/v) gel. Mix the gel with lower fat milk during any step of the lower fat milk production under mild agitation for 0.5 minute to 5 minutes, depending on the production process and temperature. The final Example 2 product concentration in the milk shall be between 0.01% (w/v) and 0.5% (w/v).

Example 6

Alternative Modified Preparation of Phosphate Modified Ultra-Fine Konjac in Low- and Non-Fat Milk Take the powder of Example 2 and mix it with lower fat milk during any step of the lower fat milk production under mild agitation for 0.5 minute to 5 minutes, depending on the process and temperature. The final powder of Example 2 concentration in the milk shall be between 0.01% (w/v) and 1% (w/v).

Example 7

Modified Preparation of Phosphate Modified Ultra-Fine Konjac in Ice Cream

Spoilage of ice cream is major concern to manufacturers, retailers, and consumers alike. After a few days in the freezer in retail stores and in consumers' homes, ice crystals start to form and ice cream starts to harden. The soft creamy mouth feel, the main attraction of the product, is gone forever. The reason for this is the repeated freeze-thaw cycles by opening of the retail freezer or the thawing cycle in consumer freezers. Here we provide a solution to this problem. The first step in industrial ice cream production typically involves dissolving milk, flavor, and other additives in boiling water. With everything else remains the same, add the powder of Example 2 to this initial product mix. The content of the powder of Example 2 in this mix shall be between 0.01% and 1% (w/v). At the high temperature, the powder of Example 2 will dissolve very quickly. Every manufacturing step afterwards shall remain the same as the manufacturer does it without the powder of Example 2. The resulting ice cream is softer than the regular one (we did not test quantitatively). More importantly, ice crystal formation (visual inspection) and hardening (qualitatively) of the ice cream with the powder of Example 2 are delayed by 5-7 days compared to the regular one.

Example 8

Modified Preparation of Phosphate Modified Ultra-Fine Konjac in Coffee

Coffee is a very popular drink. Here we describe a new type of foamy, creamy coffee that is quick and easy to prepare.

Prepare a gel as described in Example 3. Brew coffee using any of various methods, such as, but not limited to, dripping hot water through ground coffee beans. Mix 12 fl oz of brewed coffee with ¼ teaspoon of the gel in a blender, such as the Blendtec EZ blender. Set the blend speed at medium. Blend the contents for 10-15 seconds. The content is now foamy and creamy and ready to serve. Other components regularly used in coffee, such as sugar and sweetener, can be added to the mix before blending. Ice cubes can also be added before the blending to obtain iced drink with the creamy mouth feel. Milk and other diary products are not necessary for this drink since the gel composition renders the creamy mouth feel.

Example 9

Modified Preparation of Phosphate Modified Ultra-Fine Konjac in Coffee

Alternatively to Example 8, the composition of Example 4, in the powder form, is used in place of the gel. For each 12 fl oz of coffee, add 0.1 g to 1 g of the powder as described in Example 1 and Example 2 to the liquid and blend. The results of this method is comparable to using the gel form.

Example 10

Modified Preparation of Phosphate Modified Ultra-Fine Konjac with Smoothies

Smoothies are popular drinks especially in the summer time. Smoothies are here defined as mixtures of fruits (such as, but not limited to, strawberry, mango, bananas, cucumbers, etc), ice or other frozen component, a dairy component (e.g., ice cream, frozen yogurt or other diary products), sugar and/or other sweeteners and/or flavors, mixed in a blender. The blender uses rotator metal blades to break and mix contents of smoothies. The resulting product is a mixture of 3 phases (liquid, solid, and air) co-existing in the drink. Part of the unique and enticing taste of smoothies comes from this phase-mixing.

Because the mixture nature of smoothies, the smoothie texture and structure, which influence appearance and mouth-feel, are inherently fragile. The solids tend to congregate and float in the liquid. When this happens, the attractive mouth-feel of smoothie disappears. How to prolong the integrity of the smoothies is an important issue for the retailers and consumers.

By adding the composition of Example 4 to the mixture, the smoothies become more stable. Below is one example using a green tea extract-based smoothie. The application of the said composition is not limited to this specific smoothie recipe.

The smoothie contains 2 table spoons of green tea extract, 10 g-50 g to frozen yogurt, and 20-100 g ice. Sugar (or sweetener) and artificial flavor may be added to the mix to suit individual taste. In the control, mix these ingredients in a blender (such as BlendTech EZ blender) and blend at high setting for 10 seconds. Pour the content into a 16 fl oz clear plastic cup and keep it at room temperature. For the test, the only difference is to add 20 ml of a gel of the said composition in water (gel prepared from 5 grams per 1 liter of water) from Example 4 into the control mixture in the blender.

Using visual inspection, the control drink started to show phase separation within 5 minutes of preparation. A large chunk of solid formed in the center of the cup. Liquid layer started to form around the solid. By 10 minutes post preparation, the separation was very apparent. Mouth-feel became rough. Solid ice could be detected by tongue. The deterioration continued through the 30 minutes period. On the contrary, the test drink maintained smooth, creamy mouth-feel throughout the 30 minutes test period. No solid chunk formed in the test drink. Compared to the control drink, the test drink was creamier, rendering a full sensation of fatty mouth-feel.

The said composite can preserve the integrity of smoothie-type frozen drinks. This characteristics renders it a good choice for frozen drink retailers. The drink carries a fatty, creamy mouth feel without adding any fat content. In addition, the drink containing the said composition is more stable, making it possible to batch-produce smoothies. This option can increase efficiency of retail operations and may increase revenue by capturing lost sales due to long waiting time at the counter.

The above description is for the purpose of teaching the person of ordinary skill in the art how to practice the invention and is not intended to detail all of those obvious modifications and variations which will become apparent to the skilled worker. It is intended, however, that all such obvious modifications and variations be included within the scope of the invention which is defined by the following claims. The claims are meant to cover the claimed components and steps in any sequence which is effective to meet the objectives there intended, unless the context specifically indicates the contrary.

The invention claimed is:

1. A konjac composition, wherein the composition comprises konjac as a phosphate-modified gelling agent having a phosphate content (based on $PO_4$) within the range of from about 0.01% to about 0.1%, a first supporting agent, which comprises a member selected from the group consisting of carrageenan gum, Jerusalem artichoke, psyllium husk and xanthan gum, and optionally a second supporting agent, which comprises at least one member selected from the group consisting of agar, alginate, carboxymethylcellulose, casein, guar gum, gellan gum, gelatin, gum arabic, locust bean gum, and pectin; wherein the composition can reach 50% of peak viscosity in less than 2 minutes at 25° C.

2. A composition according to claim 1, wherein the gelling agent is purified konjac and comprises 30% to 90% by weight of the composition and the dry particulate size is within the range of from 100 to 200 mesh.

3. A composition according to claim 1, wherein the first supporting agent comprises from 10% to 80% by weight of the composition.

4. A composition according to claim 1, wherein the second supporting agent comprises up to 50% by weight of the composition.

5. A composition according to claim 1, wherein the gelling agent is konjac prepared by: suspending konjac in an aqueous solution of phosphate salts and up to 90% (v/v) ethanol; recovering the konjac from the suspension; and grinding the konjac to an average particle diameter of less than 0.15 mm while suspended and/or after recovery from suspension.

6. A composition according to claim 5, wherein the konjac is recovered from suspension, suspended in an aqueous alcohol solution, washed therein to reduce the phosphate content (based on $PO_4$) to less than 0.04% and recovered at least 2 times.

7. A composition according to claim 5, wherein the steps of suspending in aqueous alcohol and recovering are repeated from 3 to 6 times.

8. A composition according to claim 5, wherein the phosphate salt is soluble in aqueous ethanol solution containing from 10 to 90% ethanol, and comprises a member selected from the group consisting of alkaline earth and alkali metal salts of pyrophosphate, trimetaphosphate, phosphate, hydrophosphate, dihydrophosphate, and combinations of two or more of these, in amounts sufficient to provide a total phosphate content (as $PO_4$) of from 1%-50%.

9. A composition according to claim 5, which is prepared by adding the first supporting agent and second supporting agent to the gelling agent in solid state, suspension, solution, or combinations thereof, in any desired sequence.

10. A composition according to claim 5, which is in the form of solid, suspension, solution, partially hydrated gel, fully hydrated gel, or as a component of pre-mix with other items or combination thereof.

11. A process of making a phosphate-modified ultra-fine konjac powder according to any of claims 1 to 4, comprising: suspending konjac in an aqueous solution of phosphate salts and up to 90% (v/v) ethanol; recovering the konjac from the suspension; and grinding the konjac to an average particle diameter of less that 0.15 mm while suspended and/or after recovery from suspension.

12. A process of making a phosphate-modified ultra-fine konjac powder according to claim 8 wherein the phosphate salt is soluble in aqueous ethanol solution containing from 10 to 90% ethanol, and comprises a member selected from the group consisting of alkaline earth and alkali metal salts of pyrophosphate, trimetaphosphate, phosphate, hydrophosphate, dihydrophosphate, and combinations of two or more of these, in amounts sufficient to provide a total phosphate content (as $PO_4$) of from 1%-50%.

13. A process of making a phosphate-modified ultra-fine konjac powder according to claim 8 wherein the konjac is recovered from suspension, suspended in an aqueous alcohol solution, washed therein and recovered, this sequence being repeated at least 2 times.

14. A process according to claim 8, wherein the steps of suspending in aqueous alcohol and recovering are repeated from 3 to 6 times.

15. A process of making a phosphate-modified ultra-fine konjac powder according to claim 8 wherein is prepared by adding the first supporting agent and second supporting agent to the gelling agent in solid state, suspension, solution, or combinations thereof, in any desired sequence.

16. A process of making a phosphate-modified ultra-fine konjac powder according to claim 8 wherein the composition is in the form of solid, suspension, solution, partially hydrated gel, fully hydrated gel, or as a component of pre-mix with other items or combination thereof.

17. A process of making a phosphate-modified ultra-fine konjac powder according to claim 8 wherein the first supporting agent and second supporting agent are combined with the gelling agent in solid state, suspension, solution, or combinations thereof, in any desired sequence.

18. A konjac composition that can reach 50% of peak viscosity in less than 2 minutes at 25° C., comprising a phosphate-modified konjac powder having an average particle diameter of less than 0.15 mm as a gelling agent and a first supporting agent, which comprises a member selected from the group consisting of carrageenan gum, Jerusalem artichoke, psyllium husk and xanthan gum, wherein the composition is in dry particulate form and can be rapidly hydrated in water at a temperature of about 25° C.

19. A rapidly-hydratable konjac composition according to claim 18 which comprises is at least one member selected from the group consisting of agar, alginate, carboxymethylcellulose, casein, guar gum, gellan gum, gelatin, gum arabic, locust bean gum, and pectin in an amount of up to 50% by weight of the composition.

20. A rapidly-hydratable konjac composition according to claim 18 wherein the konjac dry particulate has a particle size within the range of from about 100 to about 200 US mesh.

21. A process for preparing a food product selected from the group consisting of ice cream, milk, coffee, frozen drinks, and tea, with improved viscosity, comprising adding to an edible material a konjac composition according to claim 1.

22. A food product with improved properties, comprising an edible material composition needing gelling or thickening, and a konjac composition according to claim 1.

\* \* \* \* \*